United States Patent [19]

Ginzburg et al.

[11] Patent Number: 5,412,691
[45] Date of Patent: May 2, 1995

[54] METHOD AND APPARATUS FOR EQUALIZATION FOR TRANSMISSION OVER A BAND-LIMITED CHANNEL

[75] Inventors: Simon A. Ginzburg, Groton; Roy W. Gustafson, Boxboro; David S. Newman, Acton, all of Mass.

[73] Assignee: Digital Equipment Corporation, Maynard, Mass.

[21] Appl. No.: 260,499

[22] Filed: Jun. 15, 1994

Related U.S. Application Data

[63] Continuation of Ser. No. 970,440, Nov. 2, 1992, which is a continuation of Ser. No. 722,746, Jun. 28, 1991.

[51] Int. Cl.⁶ ............................................. H04L 25/49
[52] U.S. Cl. ................................................. 375/296
[58] Field of Search ...................... 375/17, 42, 46, 59, 375/60, 62, 67; 332/107; 455/93; 364/724; 330/43

[56] References Cited

U.S. PATENT DOCUMENTS

| | | | |
|---|---|---|---|
| 3,456,206 | 7/1969 | Kwartiroff et al. | 330/32 |
| 3,465,101 | 9/1969 | Christian et al. | 178/68 |
| 3,733,550 | 5/1973 | Tazaki et al. | 325/38 A |
| 3,980,826 | 9/1976 | Widmer | 178/68 |
| 3,993,953 | 11/1976 | Lender et al. | 325/38 A |
| 4,083,010 | 4/1978 | Looschen | 325/321 |
| 4,371,974 | 2/1983 | Dugan | 375/82 |
| 4,380,815 | 4/1983 | Clendening | 375/80 |
| 4,462,001 | 7/1984 | Girard | 330/43 |
| 4,516,248 | 5/1985 | Barclay et al. | 375/76 |
| 4,523,181 | 6/1985 | Tazaki et al. | 340/347 DD |
| 4,553,102 | 11/1985 | Yoshida | 329/133 |
| 4,563,767 | 1/1986 | Brandt | 375/107 |
| 4,627,073 | 12/1986 | Shepperd et al. | 375/20 |
| 4,630,286 | 12/1986 | Betts | 375/39 |
| 4,637,036 | 1/1987 | Kobari | 375/76 |
| 4,748,346 | 5/1988 | Emori | 307/270 |
| 4,757,519 | 7/1988 | Collison et al. | 375/17 |
| 4,818,995 | 4/1989 | Takahashi et al. | 341/94 |
| 4,821,298 | 4/1989 | Lagadec et al. | 375/122 |
| 4,823,360 | 4/1989 | Tremblay et al. | 375/4 |
| 4,852,129 | 7/1989 | Schwartz | 375/122 |
| 4,862,485 | 8/1989 | Guinea et al. | 375/120 |
| 4,864,303 | 9/1989 | Ofek | 341/95 |
| 4,866,704 | 9/1989 | Bergman | 370/85.4 |
| 4,890,300 | 12/1989 | Andrews | 455/63 |
| 4,932,073 | 6/1990 | Ueda | 455/113 |
| 5,008,903 | 4/1991 | Betts et al. | 375/60 |
| 5,068,874 | 11/1991 | Leitch | 375/60 |
| 5,097,489 | 3/1992 | Tucci | 375/120 |
| 5,119,402 | 6/1992 | Ginzburg et al. | 375/17 |
| 5,200,979 | 4/1993 | Harris | 375/19 |
| 5,235,617 | 8/1993 | Mallard, Jr. | 375/17 |
| 5,255,287 | 10/1993 | Davies et al. | 375/17 |

OTHER PUBLICATIONS

Kim, et al, "Run-Length-Limited Variants of Duobinary and Modified Duobinary," IEEE Transactions on Communications, vol. COM-35, No. 2, Feb. 1987, pp. 142-150.

Bingham, "Improved Methods of Accelerating the Convergence of Adaptive Equalizers for Partial-Response Signals," IEEE Transactions on Communications, vol. COM-35, No. 3, Mar. 1987, pp. 257-260.

(List continued on next page.)

*Primary Examiner*—Stephen Chin
*Assistant Examiner*—William A. Luther
*Attorney, Agent, or Firm*—Kenneth F. Kozik

[57] ABSTRACT

A technique for compensating for frequency distortion in a band-limited communication channel, using a random-access memory (RAM) to store successive samples of a signal pulse, the samples having been precalculated to perform an equalization function prior to transmission of the pulse. The signal samples are retrieved, converted to analog form, and filtered to produce a precompensated analog pulse signal. In one embodiment of the invention, equalized profiles of a limited number of pulses of different shapes are stored in the RAM, and are retrieved as needed for transmittal through the band-limited channel. Thus the invention can perform its equalization function while facilitating encoding of the signal into a different form, such as modified duobinary code.

15 Claims, 3 Drawing Sheets

OTHER PUBLICATIONS

Kim, et al, "New Runlength-Limited and DC-Free Line Code of Minimum Bandwidth," Electronics Letters, Nov. 25, 1982, vol. 18, No. 24, pp. 1040–1041.

Kalet, et al, "On the Capacity of a Twisted-Wire Pair: Gaussian Model," IEEE Transactions on Communications, vol. 38, No. 3, Mar. 1990, pp. 379–383.

Kim, et al, "A Condition for Stable Minimum-Bandwidth Line Codes," IEEE Transactions on Communications, vol. COM-33, No. 2, Feb. 1985, pp. 152–157.

Kabal, et al, "Partial-Response Signaling," IEEE Transactions on Communications, vol. COM-23, No. 9, Sep. 1975, pp. 921–934.

Kobayashi, "Coding Schemes for Reduction of Intersymbol Interference in Data Transmission Systems," IBM Journal of Research and Development, Jul. 1970, pp. 343–353.

Lender, "Correlative Data Transmission with Coherent Recovery Using Absolute Reference," IEEE Transactions on Communication Technology, vol. COM-16, No. 1, Feb. 1968, pp. 108–115.

Howson, "An Analysis of the Capabilities of the Polybinary Data Transmission," IEEE Transactions on Communication Technology, 1965, pp. 312–320.

Sipress, "A New Class of Selected Ternary Pulse Transmission Plans for Digital Transmission Lines," IEEE Transactions on Communication Technology, 1965, pp. 366–372.

Ginzburg, et al, "FDDI Over Unshielded Twisted Pairs," IEEE Computer Society, Proceedings of the 15th Conference on Local Computer Networks, Minneapolis, Minnesota, Sep. 30–Oct. 3, 1990, pp. 395–398.

Conner, "Color-palette Chips Bundle Extra Features with RAM Look-up Table and DACs," Technology Update, EDN, Sep. 29, 1988, pp. 67–76.

Analog Devices, "ADV478/ADV471" Specification Sheet—CMOS 80MHz Monolithic 2, 256×24(18) Color Palette RAM-DAC, pp. 1–12.

"Special Report—FDDI," Lightwave, Feb. 1991, pp. 32–24, 36, 37, 40, and 42–45.

P. J. Van Gerwen, "Application of Pseudo-Ternary Codes for Data Transmission," Proceedings of the 13th IEEE Congress on Electronic, Rome, 1966, pp. 465–477, IEEE, New York, U.S.A.

A. Lender, et al, "Engineering of the Duobinary Repeatered Line," IEEE International Conference on Communications, Chicago, Illinois, 12th–15th Jun. 1977, vol. 1, pp. 306–309, IEEE, New Yor, U.S.A.

Kolluri, et al, "A 100Mb/s Clock Recovery and Data Retiming Chip Set".

Product Specification for NE/SA5068 Circuit, Philips Components, Oct. 19, 1989.

Product Specification for NE568A Phase-Locked Loop Circuit, Signetics Company, Jul. 1988.

Kobayashi, "A Survey of Coding Schemes for Transmission or Recording of Digital Data," IEEE Transactions on Communication Technology, vol. COM-19, No. 6, Dec. 1971, pp. 1087–1100.

Franaszek, "Sequence-State Coding for Digital Transmission," The Bell System Technical Journal, Nov. 1967, pp. 143–157.

Feher, "Digital Communications: Microwave Applications," Chapter 7, p. 150.

ved method, the invention comprises the steps of storing successive signal samples in a memory, the signal samples having amplitudes selected to provide equalization to compensate for frequency distortion in a band-limited communication channel; retrieving the successive samples from the memory; converting the samples from digital to analog form to produce a frequency-compensated analog signal; and filtering the analog signal to produce a substantially continuous output signal for transmission through the band-limited communication channel.

METHOD AND APPARATUS FOR EQUALIZATION FOR TRANSMISSION OVER A BAND-LIMITED CHANNEL

This application is a continuation of application Ser. No. 07/970,440, filed Nov. 2, 1992, which is a continuation of application Ser. No. 07/722,746, filed Jun. 28, 1991.

CROSS-REFERENCE TO RELATED APPLICATION

This application is directed to subject matter that is closely related to that of application Ser. No. 07/545,310, "Method and Apparatus for Transmission of Local Area Network Signals Over Unshielded Twisted Pairs," by Simon A. Ginzburg and John M. Rieger.

BACKGROUND OF THE INVENTION

This invention relates generally to digital communication over a band-limited channel and, more particularly, to techniques for compensating for signal attenuation in band-limited communication channels. There is a growing need to transmit high speed data over inexpensive communication media. For example, high-performance local area networks (LANs) typically use optical fiber or coaxial cable as a communication medium, but there is a need for a network design using a lower cost communication medium, such as unshielded twisted pairs of conductors, but having an equivalent performance to a network using a more expensive medium.

As described in the cross-referenced application, the use of unshielded twisted pairs of conductors in a token ring network presents a number of difficulties if transmission rates up to 125 Mb/s (megabytes per second) are to be attained. Copper conductors have a limited bandwith compared with more expensive communication media. Higher frequencies are significantly attenuated, and some form of compensation, usually referred to as equalization, is required. Equalization may be performed either before transmission, by boosting the amplitudes of higher frequency components of the signal to be transmitted, or after transmission, by amplifying the higher received frequencies. In either case, an equalizer is a relatively expensive component.

One common form of equalization circuit is a transversal filter implemented as a shift register. Digital samples of a signal are shifted through the register, each stage of which provides an output that can be multiplied by a controllable gain factor and fed to a summing circuit from which an output signal is derived. A clock signal shifts the signal samples through the register, at a higher rate than the rate at which the data changes state. Each output pulse from the equalizer is composed of a number of input pulses shifted in time and summed with different weightings to create a desired output signal shape.

The present invention provides a simple and much less costly alternative to this type of equalization circuit. An additional advantage of the invention is that it can be used to perform signal encoding simultaneously with its signal shaping function.

SUMMARY OF THE INVENTION

The present invention resides in a method and apparatus for compensating for frequency distortion in a band-limited communication channel. In terms of a novel method, the invention comprises the steps of storing successive signal samples in a memory, the signal samples having amplitudes selected to provide equalization to compensate for frequency distortion in a band-limited communication channel; retrieving the successive samples from the memory; converting the samples from digital to analog form to produce a frequency-compensated analog signal; and filtering the analog signal to produce a substantially continuous output signal for transmission through the band-limited communication channel.

In the simplest form of the invention, the analog signal to be transmitted takes the form of a series of uniform pulses, and the profile of one of the pulses is stored in the memory in frequency-compensated form. In another embodiment of the invention, the analog signal to be transmitted takes the form of a series of pulses of several different shapes, and the profile of each pulse shape is stored in the memory in frequency-compensated form. The method further comprises the steps of determining which pulse shape is to be transmitted, and initiating retrieval of the samples defining that pulse shape. The method facilitates the transmission of pulses in encoded form, such as in modified duobinary code.

The preliminary steps performed prior to storing the signal samples in the memory include determining the frequency spectrum of a signal pulse to be transmitted; determining the frequency response of the band-limited channel; multiplying the frequency spectrum of the signal pulse by the inverse of the channel frequency response, to obtain an equalized signal spectrum; and converting the equalized signal spectrum into successive signal samples for storing in the memory.

In an illustrative embodiment of the invention, the successive signal samples are stored in successive memory locations; and the step of retrieving the samples includes generating an initial memory address for retrieving the first of the samples, and incrementing the initial memory address on the occurrence of clock signals, to retrieve successive samples from the memory.

In terms of novel apparatus, the invention comprises a data memory, for storing successive signal samples having amplitudes selected to provide frequency equalization to compensate for distortion in a band-limited communication channel; means for retrieving the successive samples from the memory; a digital-to-analog converter, for converting the successive samples from digital to analog form to produce a frequency-compensated analog signal; and a filter, for filtering the analog signal to produce a substantially continuous analog signal for transmission through the band-limited communication channel.

The apparatus may further include preprocessing components, such as a Fourier transform circuit, for determining the frequency spectrum of a signal pulse to be transmitted; means for determining the frequency response of the band-limited channel; means for multiplying the frequency spectrum of the signal pulse by the inverse of the channel frequency response, to obtain an equalized signal spectrum; and an inverse Fourier transform circuit, for converting the equalized signal spectrum into successive signal samples for storing in the memory.

More specifically, in one form of the apparatus the successive signal samples are stored in successive memory locations, and the means for retrieving the signal samples includes an address generator, for generating an initial memory address for retrieving the first of the samples, an address register for storing the memory address, and means for incrementing the memory address on the occurrence of clock signals, to retrieve successive samples from the memory. When the apparatus is used to facilitate signal encoding as well as for equalization, the address generator includes means for determining which of several different pulse profiles is to be transmitted, wherein each pulse profile is stored in a different area of the data memory.

It will be appreciated from the foregoing that the present invention represents a significant advance in the field of communication systems, such as local area networks, employing low-cost but band-limited communication channels. In particular, the invention provides an alternative technique for frequency compensation, using low-cost memory and analog-to-digital converter components, instead of a more expensive transversal filter. Furthermore, the use of a memory to store precalculated signal samples facilitates encoding of the digital signals in another useful form, such as modified duobinary code, and is readily changeable to adapt to different signal and channel frequency characteristics. Other aspects and advantages of the invention will become apparent from the following more detailed description, taken in conjunction with the accompanying drawings.

DESCRIPTION OF THE PREFERRED EMBODIMENT

Figure 1:
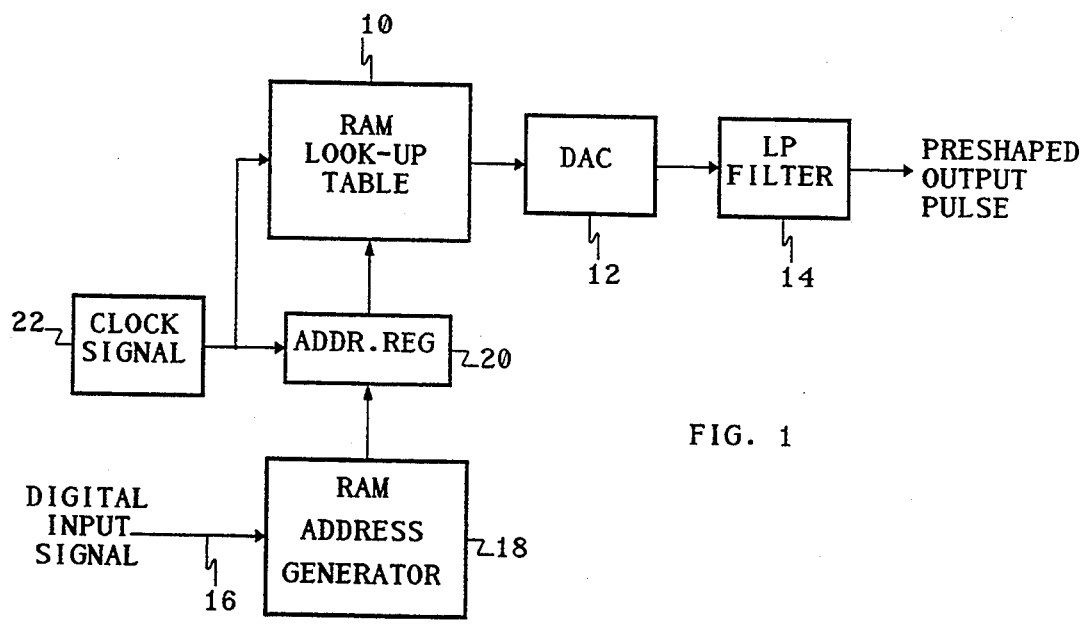
FIG. 1 is block diagram of the basic apparatus of the invention.

As shown in the drawings for purposes of illustration, the present invention is concerned with a technique for equalizing signals prior to transmission through a band-limited communication medium, such as unshielded twisted conductor pairs. Without equalization, transmission through a band-limited medium results in significant attenuation of higher frequency components of a transmitted signal. If the signal is preshaped to emphasize these higher frequency components to the same degree that they will be attenuated by the transmission medium, a practically flat and uniform overall frequency response will be obtained. Equalization by conventional methods usually employs relatively expensive transversal filters.

In accordance with the present invention, equalization is performed by using a memory lookup table to store a pulse shape that has been previously calculated to emphasize higher frequencies to such a degree that there is practically exact compensation for attenuation in the transmission medium. When a pulse is to be transmitted, a set of successive signal samples is retrieved from the memory, converted from digital to analog form, filtered, and transmitted through the communication medium.

The apparatus of the invention is depicted in FIG. 1, and includes a random access memory (RAM) lookup table, indicated by reference numeral 10, and a digital-to-analog converter 12. The RAM lookup table 10 has stored in it a sequence of signal sample values corresponding to a signal pulse to be transmitted over a band-limited channel (not shown). The stored digital samples include equalization data, i.e. they represent an equalized or compensated form of a desired signal pulse. Basically the pulse is shaped, prior to transmission, such that, when received at the other end of the channel, will have a desired shape.

Each sample retrieved from the RAM lookup table 10 is converted to analog form for output over the band-limited channel. A low-pass filter 14 at the output of the digital-to-analog converter 12 removes unwanted frequency components, specifically the clock frequency at which the signal components are retrieved from the RAM lookup table 10. Understanding operation of the apparatus is facilitated if one considers that the digital signals being transmitted are pulses of equal width and amplitude. As will be later described, appropriate encoding of the digital signals will ensure that they consist of pulses of only two possible widths or time durations.

In general, a digital input signal to be transmitted is received on line 16 by a RAM address generator 18. In the simple case of uniform width digital pulses, the RAM address generator 18 simply generates, on the occurrence of an input pulse, a starting address for the RAM lookup table 10, i.e. the address of the first of a sequence of prestored signal samples defining the equalized pulse. The generated RAM address is stored in an address register 20, which is connected to address lines 22 of the RAM lookup table 10. A clock signal, indicated at 22, periodically increments the address stored in the address register 20, and also controls the function of reading samples from the RAM lookup table 10. As each new pulse appears on input line 16, the address register is reset to the starting point of the stored sequence of signal samples defining the equalized pulse.

Fortunately, the combination of a RAM and a digital-to-analog converter is readily available for color video graphics applications. A review of available devices of this type, known as RAMDACs, can be found in a published periodical referred to as EDN, Sep. 29, 1988, pp. 67-76. This device includes a RAM, three digital-to-analog converters, only one of which need be used for the purpose of the invention, an address register, and related latching and multiplexing circuitry. The entire device costs only a few dollars, and represents a very low-cost alternative to other equalization devices.

The function performed by the RAM address generator is slightly more complicated than in the simple case described earlier if the input pulses are other than of equal width, as will shortly be explained. First, the manner in which signals are prestored in the RAM lookup table will be explained in more detail.

Figure 2A:
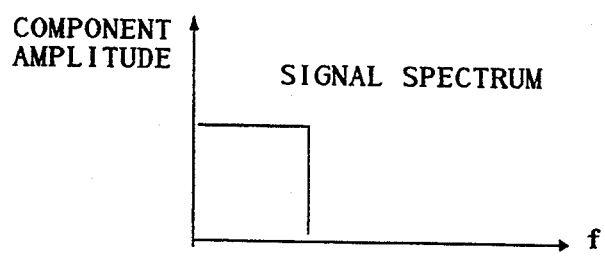
FIGS. 2A-2D illustrate the frequency spectra of the original signal, the channel response, the equalized transmitted signal spectrum and the received signal spectrum, respectively.
Figure 2B:
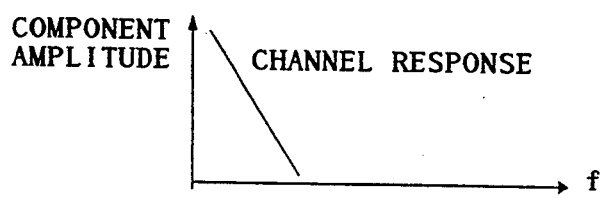
Figure 2C:
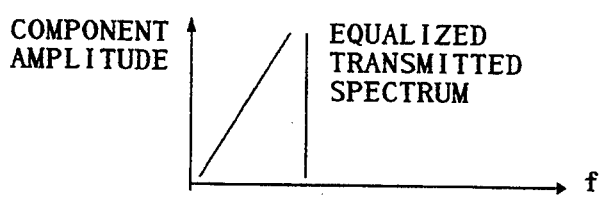
Figure 2D:
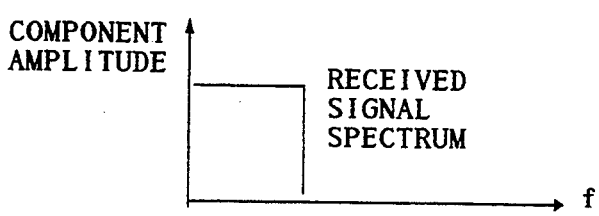

If the signal pulse to be transmitted is assumed to have a flat frequency spectrum, as shown diagrammatically in FIG. 2A, the effect of passing the pulse through the band-limited channel will be to attenuate the higher frequency components. This is shown diagrammatically in FIG. 2B, which depicts a linear drop-off of response with frequency. If the pulse is equalized before transmission in a manner inversely proportional to the response of the channel, the effect of channel attenuation will be minimized. Thus, the spectrum of the compensated or equalized signal pulse should be similar to that of FIG. 2C. Then the received signal spectrum should theoretically be flat again, as indicated in FIG. 2D.

In many applications of the invention, the nature of the signal pulses to be transmitted will be known, and the characteristics of the band-limited channel will also be known. In the case of a network, the length of the channel may not be known, since message packets may be received at various points along the network transmission medium. An average channel response characteristic may be used for all transmissions, or more complex techniques may be used to derive an equalized pulse with more precision.

Figure 3:
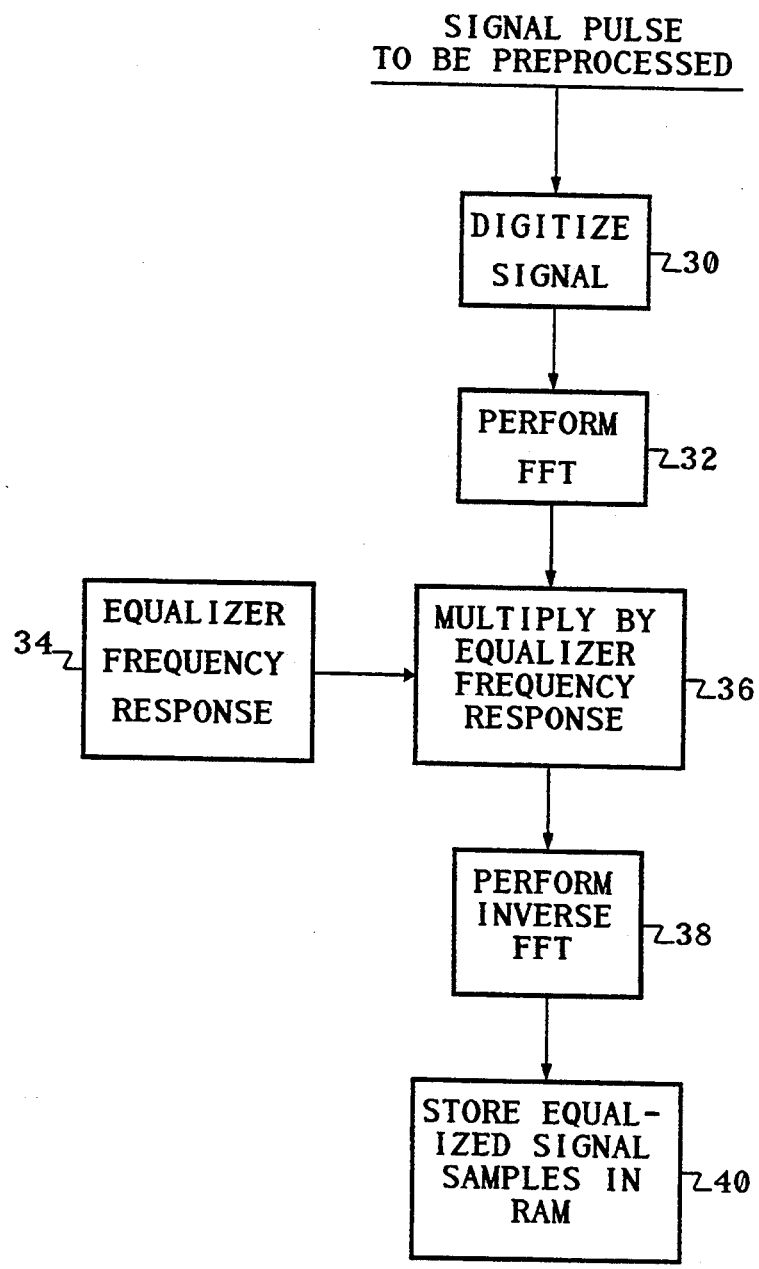
FIG. 3 is a flowchart showing the steps followed in deriving a set of signal samples for storing in the device of the invention.

In the usual case in which the characteristics of both the signal and the channel are known, the steps needed to generate the signal samples for storage in the RAM lookup table 10 are shown in FIG. 3. The desired signal pulse is digitized, as indicated at 30, at the same sampling rate at which the RAM lookup table 10 will be operated, and the resulting samples are subject to spectral analysis using a conventional fast Fourier transform (FFT) module, as indicated at 32. This provides a version of the signal pulse transformed to the frequency domain, i.e. the amplitudes of the signal's various frequency components are derived. These amplitudes are then multiplied by corresponding factors derived from the desired equalizer frequency response, indicated at 34. The multiplication step is indicated at 36. After multiplication, the signal obtained is in equalized form, but still in the frequency domain. Finally, the equalized spectrum is subject to inverse FFT processing, as indicated in block 38, to derive corresponding amplitudes in the time domain, and these amplitudes are stored in successive locations of the RAM lookup table 10, as indicated at 40.

The foregoing explanation covers applications in which the signal to be transmitted consists of pulses of equal width, although not necessarily uniformly spaced. A more general case, however, is one in which the binary signal to be transmitted assumes one or the other of two signal levels. As discussed in some detail in the cross-referenced application, it is extremely desirable from a bandwidth compression standpoint to use a multilevel encoding scheme of some type before transmission through the communication channel. An encoding technique that is presently preferred is the modified duobinary, the details of which are discussed in the cross-referenced application.

As is known in the digital communication art, duobinary encoding is a technique for increasing the bit rate than can be handled over a channel of a given bandwidth. Duobinary encoding is effected by combining two successive binary signal to form a multilevel signal, which is further processed by a shaping filter. The resulting signal still has the disadvantage that it contains frequency components in the vicinity of zero frequency. This property is avoided in "modified" duobinary encoding, in which binary signals two time periods apart are combined subtractively. The result is a three-level signal with no significant components in the vicinity of zero frequency. Typically, a low-pass filter with a sine function response is employed after the encoding step. Circuitry for performing modified duobinary encoding and decoding was illustrated and described in the cross-referenced application.

An important property of modified duobinary code, from the standpoint of the present invention, is that the encoded three-level signal consists of a sequence of positive pulses and negative pulses, the width (i.e. duration) of which may be either one or two time intervals, where a time interval is the minimum time period in which the modified duobinary signal or the original binary signal may change state. Therefore, the RAM lookup table 10 in the present invention can be programmed to contain samples corresponding to a single-width pulse and a double-width pulse. Negative pulses of single and double widths might also be stored in the RAM lookup table 10, or the positive pulse samples can be simply inverted to generate the negative pulses. Therefore, in addition to performing its equalization function, the present invention facilitates the generation of an encoded modified duobinary signal.

Figure 4:
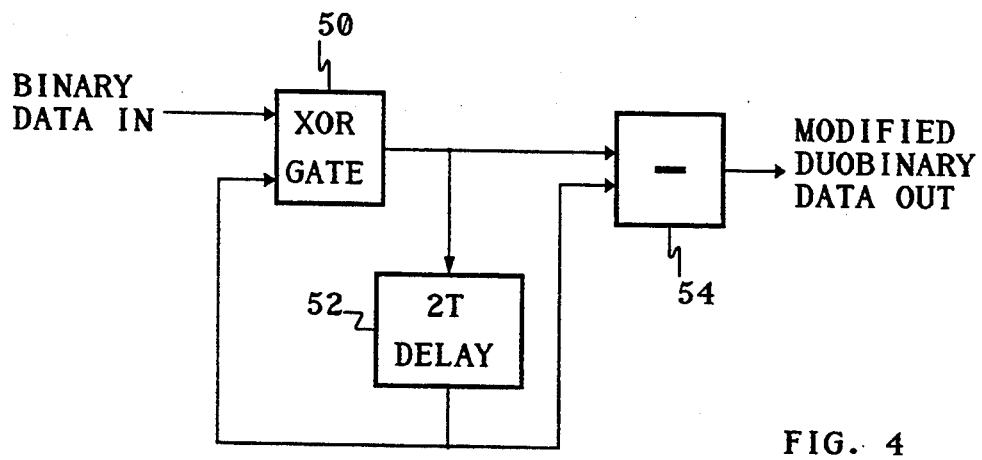
FIG. 4 is a block diagram illustrating a basic modified duobinary encoding technique.
Figure 5A:
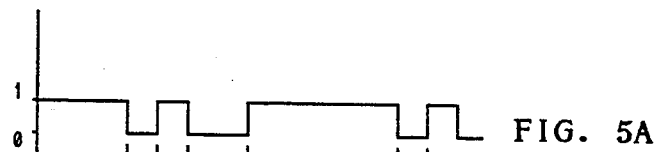
FIGS. 5A-5D are waveforms, by way of example, of signals at various points in the encoding circuitry of FIG. 4.
Figure 5B:
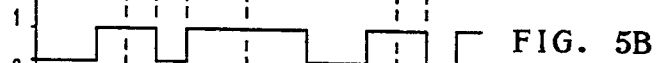
Figure 5C:
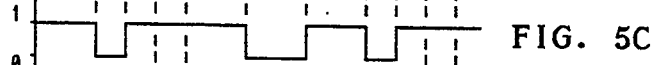
Figure 5D:
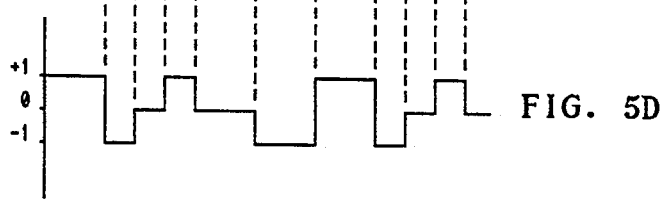

FIG. 4 shows a simple encoding circuit for converting a simple binary signal to modified duobinary code. The circuit includes provision for precoding, using an exclusive OR gate 50 and a two-cycle delay circuit 52 connected to the output of the exclusive OR gate. The binary input signal is connected as one input to the exclusive OR gate 50, and the other input is fed back from the output of the delay circuit 52. FIG. 5A is an example of a binary input signal waveform. FIG. 5B is the waveform of a corresponding signal output from the delay circuit 52. The output of the exclusive OR gate 50 provides precoded binary signals, shown in FIG. 5C. Thus, the waveform of FIG. 5C is the exclusive OR of the waveforms of FIGS. 5A and 5B. The precoded binary signals are then applied as one input of a subtractor circuit 54. The other input of the subtractor circuit 54 is derived from the output of the delay circuit 52. The output of the subtractor circuit 54 represents the difference between the signals of FIGS. 5B and 5C. This is the modified duobinary signal shown in FIG. 5D. At each time interval, the modified duobinary signal is the difference between the value of the precoded binary signal (FIG. 5C) and the precoded binary signal delayed by two time cycles (FIG. 5B).

It will be observed that the modified duobinary signal consists of positive and negative pulses of width T and 2T, where T is the time interval of the original binary signal. Therefore, it is only necessary to store two pulse profiles in the RAM lookup table 10 in order to transmit modified duobinary code through the band-limited channel. One pulse profile is for the single-width pulse and the other for a double-width pulse. Negative-going pulses can be generated by simply inverting the output signals from the RAM lookup table 10 at appropriate times. Using the invention in this manner requires somewhat more complex logic in the RAM address generator 18. Basically, the address generator must determine which pulse profile is to be transmitted, and then generate the appropriate RAM starting address for the location at which the profile samples are stored. If only two pulse profiles are stored, the RAM address generator 18 must also generate an inverting control signal, to invert data retrieved from the RAM lookup table 10. Alternatively, four separate pulse profiles can be stored, two positive and two negative.

It will be appreciated from the foregoing that the present invention represents a significant advance, in that transmitter equalization can be accomplished simply and at lower cost than using conventional methods. Moreover, the use of a RAM lookup table for equalization has the advantage that it can be readily adapted for use with other types of binary codes, and is well suited for use with modified duobinary code. A related advantage is that the contents of the RAM lookup table can be readily modified to match different band-limited communication channels and different desired signal pulse profiles.

It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method of compensating for a band-limited communication channel, comprising the steps of:
   storing successive signal samples in a memory, the signal samples having amplitudes selected to provide frequency equalization to compensate for frequency distortion in a band-limited baseband communication channel;
   retrieving the successive samples from the memory;
   converting the successive samples from digital to analog form to produce a frequency-compensated analog signal; and
   filtering the analog signal to produce a substantially continuous output signal for baseband transmission through the band-limited communication channel; and wherein
   the signal to be transmitted takes the form of a series of pulses of several different widths,
   the profile of each pulse shape is stored in the memory in frequency-compensated form, and
   the method further comprises the steps of determining which pulse width is to be transmitted, and initiating retrieval of the samples relating to that pulse width.

2. A method as defined in claim 1, wherein:
   the signal to be transmitted is a modified duobinary code signal.

3. A method as defined in claim 1, wherein:
   the successive signal samples are stored in successive memory locations; and
   the step of retrieving includes generating an initial memory address for retrieving the first of the samples, incrementing the initial memory address on the occurrence of clock signals, to retrieve successive samples from the memory.

4. A method of compensating for attenuation of signals to be transmitted on a band-limited communication channel, said signals to be transmitted taking the form of a series of pulses of several different widths, comprising the steps of:
   creating a library of digital signal samples by storing digital signal samples in a memory, said signal samples representing the profile of said pulses of several different widths, and said signal samples having amplitudes selected to provide frequency equalization to compensate for frequency distortion in a band-limited baseband communication channel;
   receiving an input signal to be transmitted on said band-limited baseband communication channel;
   determining the profile of said input signal;
   retrieving from said memory, in response to said determination of said profile of said input signal, digital signal samples which represent said profile of said input signal in frequency-equalized form;
   converting said digital signal samples from digital to analog form to produce a frequency-compensated analog signal; and
   filtering said analog signal to produce an output signal for baseband transmission through the band-limited communication channel.

5. A method as defined in claim 1 or claim 4, and further comprising the preliminary steps of:
   determining the frequency spectrum of a signal pulse to be transmitted;
   determining the frequency response of the band-limited channel;
   multiplying the frequency spectrum of the signal pulse by the inverse of the channel frequency response, to obtain an equalized signal spectrum; and
   converting the equalized signal spectrum into digital signal samples for storing in the memory.

6. A method as defined in claim 4, and further comprising the preliminary step of:
   converting said input signal to be transmitted into modified duobinary code before determining the profile of said input signal.

7. A method as defined in claim 4, further comprising:
   storing said digital signal samples in successive memory locations;
   generating an initial memory address;
   reading the digital signal sample from the memory location indicated by said memory address;
   incrementing said memory address on the occurrence of a clock signal; and continuing reading digital signal samples and incrementing said memory address on the occurrence of said clock signal until a new input signal is to be transmitted on the communication channel.

8. Apparatus for compensating for a band-limited communication channel, comprising:
   a reusable data memory, for storing successive signal samples having amplitudes selected to provide frequency equalization to compensate for distortion of baseband transmission in a band-limited communication channel;
   means for retrieving the successive samples from the memory;
   means for modifying the data memory as necessary to make corrections and adjustments, depending on channel parameters encountered;
   a digital-to-analog converter, for converting the successive samples from digital to analog form to produce a frequency-compensated analog signal; and
   a filter, for filtering the analog signal to produce a substantially continuous output signal for transmission through the band-limited communication channel;
   wherein
   the signals to be transmitted take the form of a series of pulses of several different widths;
   the profile of each pulse of different width is stored in the memory in frequency-compensated form; and
   the apparatus further comprises means for determining which pulse width is to be transmitted, and initiating retrieval of the samples relating to that pulse width.

9. Apparatus as defined in claim 8, wherein:
   the signal to be transmitted is a modified duobinary code signal.

10. Apparatus as defined in claim 8, wherein:
    the successive signal samples are stored in successive memory locations; and
    the means for retrieving the signal samples includes an address generator, for generating an initial memory address for retrieving the first of the samples, an address register for storing the memory address, and means for incrementing the memory address on the occurrence of clock signals, to retrieve successive samples from the memory.

11. Apparatus for compensating for attenuation of signals to be transmitted on a band-limited communication channel, said signals to be transmitted taking the form of a series of pulses of several different widths, comprising:

a reusable data memory, for storing digital signal samples, said digital signal samples representing the profile of said pulses of several different widths, and said digital signal samples having amplitudes selected to provide frequency equalization to compensate for frequency distortion in a band-limited baseband communication channel;

means for receiving an input signal to be transmitted on said band-limited baseband communication channel;

means for determining the profile of said input signal;

means, in response to said determination of said profile of said input signal, for retrieving from said memory digital signal samples which represent said profile of said input signal in frequency-equalized form;

a digital-to-analog converter, for converting said digital signal samples from digital to analog form to produce a frequency-compensated analog, signal; and a filter, for filtering said analog signal to produce an output signal for baseband transmission through the band-limited communication channel.

12. Apparatus as defined in claim 11, and further comprising:

means for converting said input signal to be transmitted into modified duobinary code before determining the profile of said input signal.

13. Apparatus as defined in claim 8 or claim 11, and further comprising:

a Fourier transform circuit, for determining the frequency spectrum of a signal pulse to be transmitted;

means for determining the frequency response of the band-limited channel;

means for multiplying the frequency spectrum of the signal pulse by the inverse of the channel frequency response, to obtain an equalized signal spectrum; and an inverse Fourier transform circuit, for converting the equalized signal spectrum into digital signal samples for storing in the memory.

14. Apparatus as defined in claim 11, further comprising:

means for storing the digital signal samples in successive memory locations;

an address generator, for generating an initial memory address;

an address register, for storing said memory address;

means for reading the digital signal sample from the memory location indicated by said memory address;

means for incrementing said memory address on the occurrence of a clock signal; and means for continuing retrieving digital signal samples and incrementing said memory address on the occurrence of said clock signal until a new input signal is to be transmitted on the communication channel.

15. Apparatus as defined in claim 10 or claim 14, wherein:

the address generator includes means for determining which of several different pulse profiles is to be transmitted, wherein each pulse profile is stored in a different area of the data memory.

* * * * *